(12) United States Patent
Mayer et al.

(10) Patent No.: US 9,093,882 B2
(45) Date of Patent: Jul. 28, 2015

(54) ELECTRIC MOTOR HAVING ELECTRICAL CONNECTOR RACK

(75) Inventors: Bernd Mayer, Ellwangen (DE); Reiner Zebisch, Boebingen (DE)

(73) Assignee: C. & E. FEIN GMBH (DE)

( * ) Notice: Subject to any disclaimer, the term of this patent is extended or adjusted under 35 U.S.C. 154(b) by 644 days.

(21) Appl. No.: 13/331,187

(22) Filed: Dec. 20, 2011

(65) Prior Publication Data

US 2012/0153751 A1    Jun. 21, 2012

(30) Foreign Application Priority Data

Dec. 20, 2010 (DE) .......................... 10 2010 056 120

(51) Int. Cl.
*H02K 11/00* (2006.01)
*H02K 3/52* (2006.01)

(52) U.S. Cl.
CPC ............ *H02K 3/522* (2013.01); *H02K 2203/03* (2013.01)

(58) Field of Classification Search
CPC   H02K 5/225;  H02K 15/0068;  H02K 15/0062
USPC .......................................................... 310/71
See application file for complete search history.

(56) References Cited

U.S. PATENT DOCUMENTS

| | | | |
|---|---|---|---|
| 3,551,713 A | 12/1970 | White | |
| 4,673,834 A | 6/1987 | Wrobel | |
| 6,177,741 B1 | 1/2001 | Lütkenhaus et al. | |
| 7,582,999 B2 * | 9/2009 | Atkinson | 310/179 |
| 8,035,263 B2 * | 10/2011 | Kienzler et al. | 310/71 |
| 8,143,752 B2 * | 3/2012 | Altindis | 310/71 |
| 2003/0173857 A1 * | 9/2003 | Jones | 310/254 |
| 2005/0082931 A1 * | 4/2005 | Burgbacher | 310/179 |
| 2006/0158049 A1 * | 7/2006 | Suzuki et al. | 310/52 |
| 2006/0214535 A1 * | 9/2006 | Salmon | 310/309 |
| 2006/0265871 A1 * | 11/2006 | Ito et al. | 29/854 |
| 2007/0296292 A1 * | 12/2007 | Kienzler et al. | 310/71 |
| 2010/0141058 A1 * | 6/2010 | Kim et al. | 310/43 |
| 2010/0213788 A1 * | 8/2010 | Guttenberger et al. | 310/216.135 |
| 2012/0104878 A1 * | 5/2012 | Heilman et al. | 310/43 |

FOREIGN PATENT DOCUMENTS

| | | | |
|---|---|---|---|
| DE | 2741583 A1 | 3/1978 | |
| DE | 3505092 A1 | 8/1986 | |
| GB | 1591574 A | 6/1981 | |
| JP | 11187603 A | 7/1999 | |
| WO | 02087057 A1 | 10/2002 | |

* cited by examiner

*Primary Examiner* — Terrance Kenerly
(74) *Attorney, Agent, or Firm* — St. Onge Steward Johnston & Reens LLC

(57) ABSTRACT

The invention discloses a connector rack for an electric motor, in particular for an electronically commutable motor having a plurality of exciter windings for a power tool, having at least one electronic mounting board, on which a plurality of contact carriers is provided for electrically contacting the exciter windings.

19 Claims, 4 Drawing Sheets

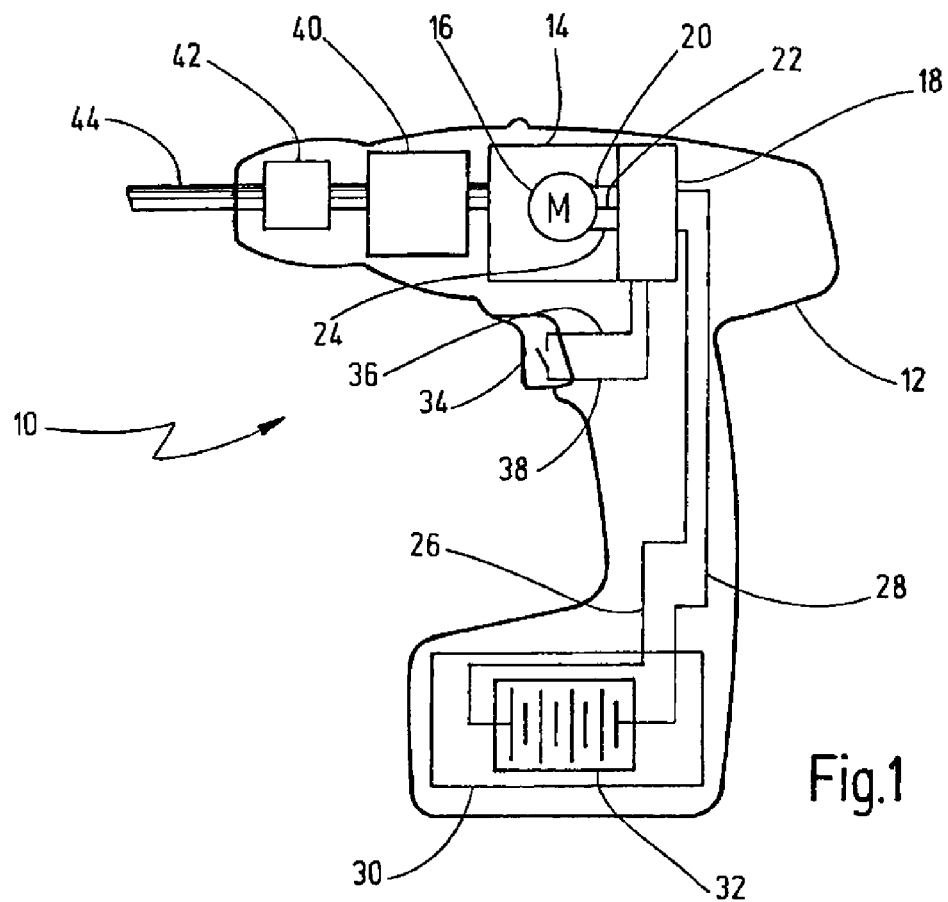
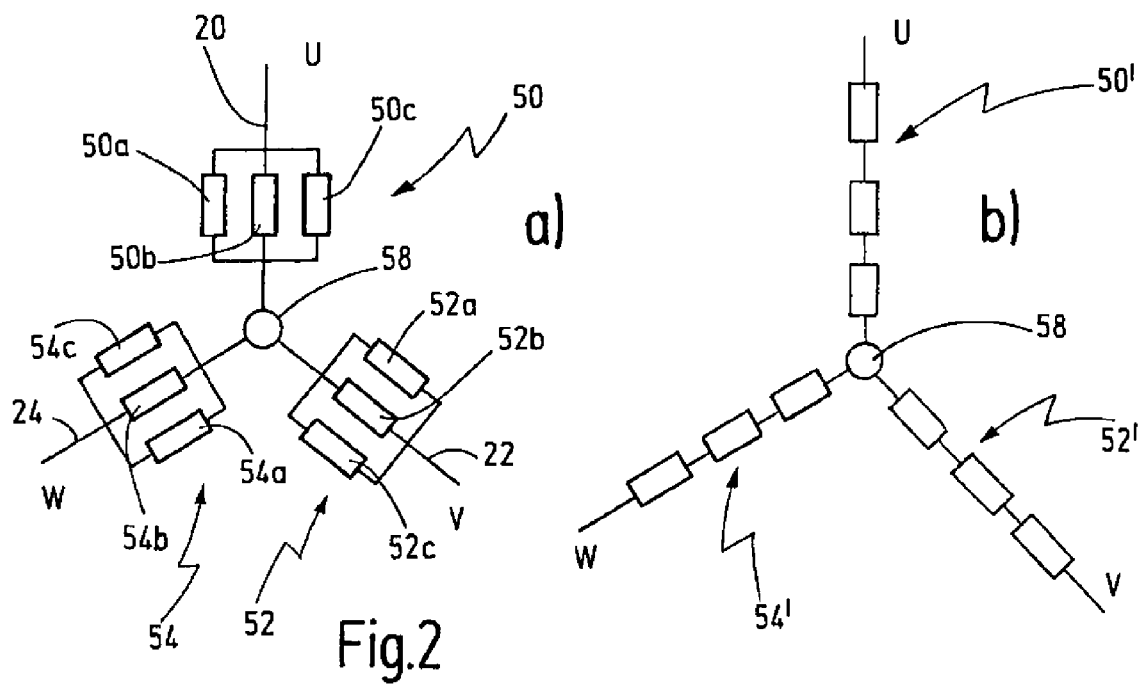
Fig.1
Fig.2

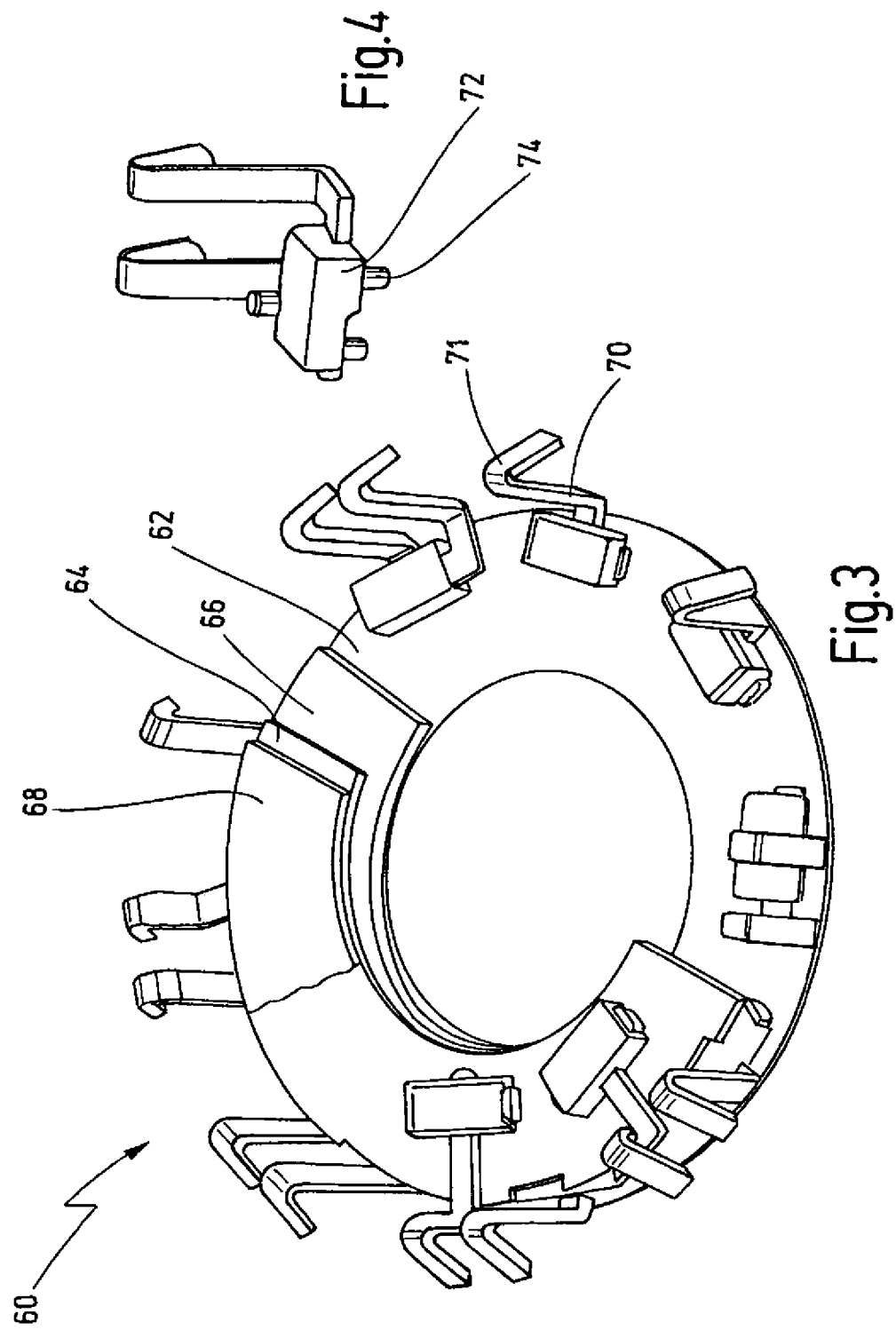

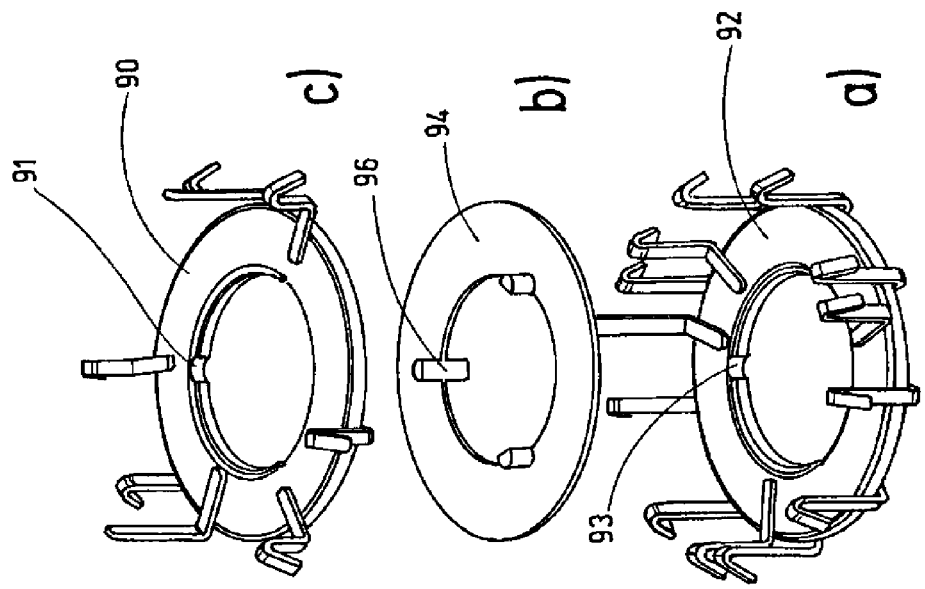
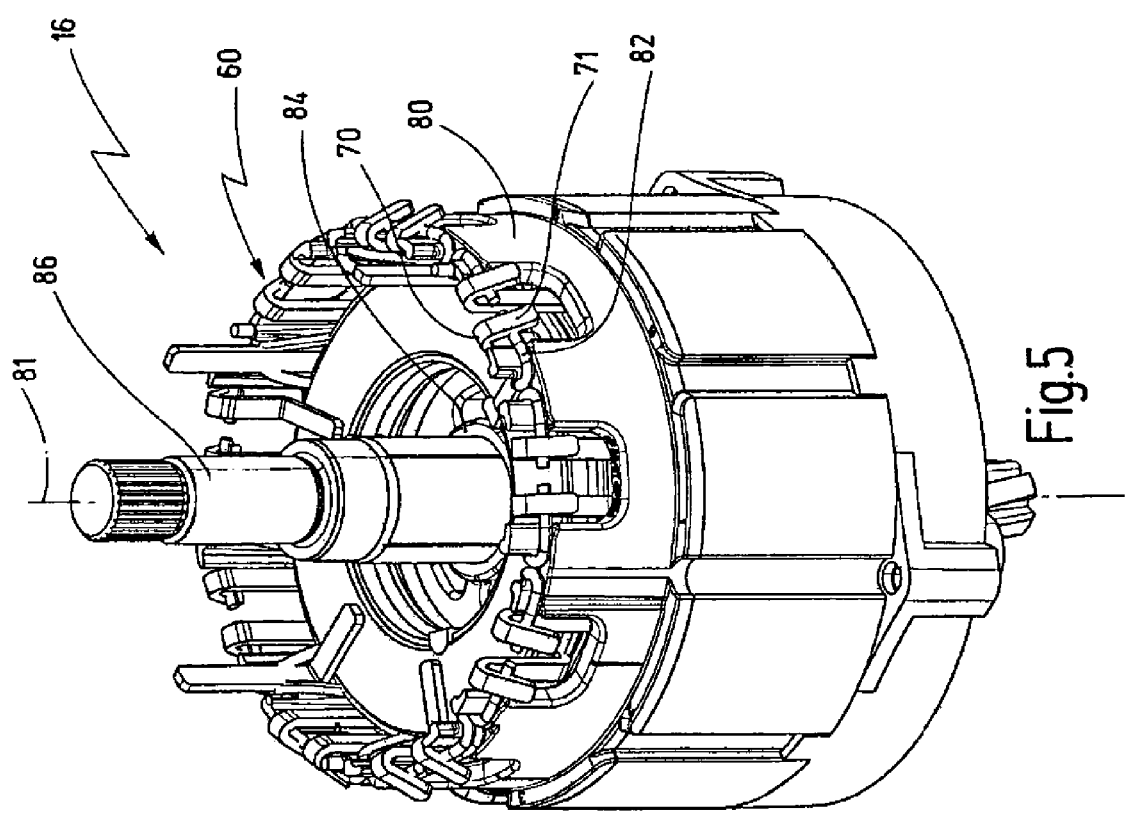

ELECTRIC MOTOR HAVING ELECTRICAL CONNECTOR RACK

CROSSREFERENCES TO RELATED APPLICATIONS

This application claims priority from German patent application 10 2010 056 120.7, filed on Dec. 20, 2010. The entire contents of this priority application is incorporated herein by reference.

BACKGROUND OF THE INVENTION

The invention relates to a connector rack for an electric motor, in particular for an electronically commutable motor having a plurality of exciter windings for a power tool.

Furthermore, the invention relates to an electric motor having such a connector rack.

Such a connector rack or such an electric motor is known from WO 2002/087057 A1.

The known electric motor is an electronically commuted DC motor having a stamped grid, on which plug pins, winding phases, power terminals, and terminals of further components are contacted. The stamped grid has an upper grid layer and a lower grid layer, which each comprise a number of contacts.

A compact construction of the electric motor can be supported using such a stamped grid. However, it has been shown that the production and in particular the handling of the grid layers of such stamped grids are particularly complex if a plurality of different contacts are to be configured on a plurality of grid layers. This finally results in contact areas, which must be completely separated from other areas of the respective grid layer in the course of manufacturing, in order to be able to produce an insulation therefor. Furthermore, such an embodiment has the disadvantage of an inflexible design, which can only be adapted to an altered circuit of the electric motor with great effort.

SUMMARY OF THE INVENTION

It is a first object of the invention to disclose a connector rack for an electric motor, in particular for an electronically commutable motor having a plurality of exciter windings for a power tool, whereby simple and reliable contacting of the exciter windings is possible.

It is a second object of the invention to disclose a connector rack for an electric motor allowing for a high flexibility in wiring the electric motor which is contacted by the connector rack.

It is a third object of the invention to disclose an electric motor having a plurality of exciter windings and a connector rack allowing simple and reliable contacting of the exciter windings.

According to the invention these and other objects are achieved by an electronic motor comprising
  a stator having a plurality of exciter windings;
  a rotor received rotatably within the stator;
  a plurality of exciter windings arranged on the stator;
  a controller for powering the exciter windings; and
  a connector rack for connecting the exciter windings and the controller;
  wherein the connector rack comprises at least two electronic mounting boards carrying a plurality of contact carriers for connecting the exciter windings and the controller.

The object of the invention is achieved in this way.

Specifically, a highly flexible connector rack for an electric motor is disclosed which is of surprisingly simple design. In that it deviates from the construction using stamped grids and instead electronic mounting boards are provided, which can be individually equipped with contact carriers for the electrical contacting of the exciter windings, a simple construction and a particularly high flexibility result.

The mounting boards are preferably configured as electronic circuit boards for this purpose.

In one design of the mounting boards as electronic circuit boards (also known as PCBs, printed circuit boards), the surface can be provided in a known way as nearly arbitrarily segmented or with coherent conductors, simple and flexible production being made possible. The base consists of insulating material in this case and is coated with conductive material in the desired way. The production is typically performed from material coated over the entire area employing a lithographic etching method, by means of which the desired segmenting can be generated. The relevant contact carriers are preferably soldered or welded to the mounting boards, corresponding receptacle points preferably being provided on the mounting boards or electronic circuit boards for this purpose.

According to a further design of the invention, at least one mounting board is configured as a double-sided printed electronic circuit board.

Still further increased flexibility in the connection results in this way.

According to a refinement of the invention, the mounting boards can additionally also be used for further functions or for receiving further parts, for example for receiving sensors, such as Hall sensors.

According to a further embodiment of the invention, multiple layers of mounting boards are provided, which are provided one over another.

In this way, different circuits can be configured in a particularly simple way by various carrier levels for the contact carriers. If printed conductors are provided on both sides of the mounting boards or electronic circuit boards, contact carriers can be fastened both above and also below a mounting board. Especially good adaptation to various required terminal positions for connecting exciter windings and for connecting the exciter windings to the control electronics results in this way.

According to a further design of the invention, at least one insulating element is provided for insulating adjacent mounting boards or for insulating one mounting board to the outside.

In this way, adjacent mounting boards can be safely insulated from one another by interposing an insulating element. In order to insulate the connector rack to the outside, an insulating element can also be provided or else an electronic mounting board can be used, which is not provided with printed conductors on the respective outer side and therefore has an insulating effect.

The contact carriers are preferably configured as flat wire elements, which preferably consist of copper wire.

These can be contact carriers configured as welding or soldering hooks, in this case, for example.

These can be used as relatively simple prefinished bent or stamped parts and can be soldered or welded to the electronic mounting boards at the relevant contact points.

According to a further design of the invention, the contact carriers at least partially have ends which are configured for fastening winding terminals by clamping, soldering, or welding.

Simple and reliable connection to the winding terminals is made possible by these measures.

The mounting boards are configured essentially in the form of a circular ring according to a further preferred design of the invention.

In this way, they can be optimally adapted to the typical cross-sectional shape of an associated stator of an electric motor.

The mounting boards are preferably tailored to their respective shape and size by milling or stamping in this case.

According to a further design of the invention, the contact carriers at least partially protrude substantially perpendicularly in the axial direction from a radial plane spanned by the mounting boards.

Such an arrangement of the contact carriers has the advantage that a particularly good adaptation to the connection to the assigned terminals of windings results.

According to a further design of the invention, at least one mounting board has printed conductors, which are separate from one another, on at least one surface, preferably printed conductors which are segmented from one another in the peripheral direction.

Different connection variants may be configured using only a few mounting boards in this way, for example a star series circuit, only four mounting boards located one over another then being required for this purpose, one mounting board having through-contact for the star point and three mounting boards each having segmented printed conductors for the various winding terminals of one winding phase U, V, W each.

According to a further embodiment of the invention, at least two mounting boards situated one over another are provided, which are mechanically connected to one another via pins.

In this way, simple and reliable connection of multiple mounting boards arranged one over another results.

Furthermore, the pins are preferably mounted on an insulating element.

According to a further embodiment of the invention, at least one fastening element made of an insulating material is provided for fixing a contact carrier on a mounting board, which preferably has at least one plug element, which engages in an assigned recess of the mounting board.

In this way, the fastening of the contact carriers on the mounting board is made easier. Through the use of plug elements, precise positioning of the respective contact carrier on mounting boards can be ensured in this case.

According to a different aspect of the invention a connector rack in an electric motor is disclosed, the electric motor comprising:
- a stator having a plurality of exciter windings;
- a rotor received rotatably within the stator;
- a plurality of exciter windings arranged on the stator;
- a controller for powering the exciter windings;
- wherein the connector rack is configured for connecting the exciter windings and the controller and comprises at least two electronic mounting boards carrying a plurality of contact carriers for connecting the exciter windings and the controller.

BRIEF DESCRIPTION OF THE DRAWINGS

It is obvious that the above-mentioned features and the features of the invention still to be explained hereafter are usable not only in the respectively specified combination, but rather also in other combinations or alone, without leaving the scope of the invention.

Further features and advantages of the invention result from the following description of preferred exemplary embodiments with reference to the drawing. In the drawings:

FIG. 1 shows a schematic view of a power tool having an electric motor according to the invention;

FIG. 2a) shows a simplified circuit diagram of a star parallel circuit for generating a rotary field in an electric motor according to the invention;

FIG. 2b) shows a simplified circuit diagram of a star series circuit for generating a rotary field in an electric motor according to the invention;

FIG. 3 shows a perspective view of a connector rack according to the invention, individual mounting boards only being shown partially one over another;

FIG. 4 shows an enlarged view of a contact carrier according to FIG. 3 having an assigned fastening element for fixing on the mounting board;

FIG. 5 shows a perspective view of an electric motor according to the invention having stator, rotor, and connector rack for contacting the winding ends;

FIG. 6 shows two mounting boards having an insulating element situated in between, in an exploded view one over another in the later installation location;

FIG. 7a showing the top side of the first mounting board.

DESCRIPTION OF PREFERRED EMBODIMENTS

Figure 7:
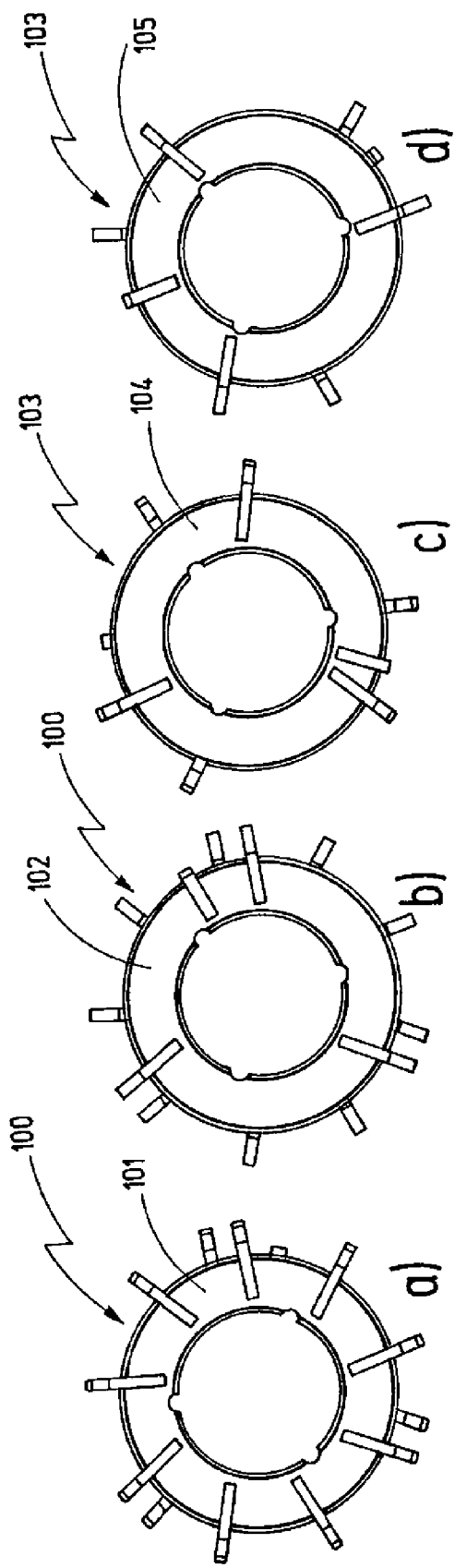
FIGS. 7a) to d) show two mounting boards having continuous printed conductors, which are assembled to form a connector rack, in order to implement a star parallel circuit.
FIG. 7b) showing the bottom side of the first mounting board.
FIG. 7c) showing the top side of the second mounting board.
FIG. 7d) showing the bottom side of the second mounting board.

FIG. 1 schematically shows a power tool, which is identified as a whole by 10.

The power tool 10 has a housing 12, in which a drive 14 having an electric motor 16 and a motor controller 18 is accommodated. For example, the electric motor 16 has three contacts 20, 22, 24, via which three winding phases U, V, W can be energized, for example. It can thus be an electric motor, to which a rotary field is applied, having a permanently excited rotor, in this case.

The motor controller 18 is configured for the purpose of applying the alternating field to the phases of the motor U, V, W. This type of excitation can be an electronic commutation. The alternating field can in this case have a sinusoidal curve, can be configured as block shaped, or can have a pulse-width-modulated block-shaped signal curve, by means of which a sinusoidal curve can be approximated, for example.

The motor controller 18 is coupled via supply lines 26, 28 to a power supply unit 30. According to the illustration in FIG. 1, the power supply unit 30 can have a battery 32, which supplies the motor controller 18 with direct current via the supply lines 26, 28.

The motor controller 18 can similarly be connected to external power supply units, for example power adapters or rectifiers.

In a handle area of the housing 12 of the power tool 10, a switch 34 is provided, via which an operator can activate the power tool 10. The switch 34 is coupled via signal lines 36, 38 to the motor controller 18.

The drive 14 is configured for driving a tool 44. A gear 40, for adapting speed, torque, or rotational direction, or a socket 42 can be connected between the drive 14 and the tool 44. The socket 42 can have means for receiving and exchanging various tools. In addition, the socket 42 can be configured for the purpose of disconnecting the friction lock between the drive 14 and the tool 44 in the event of an excessively high torque or torque increase, for example, and protecting the drive 14 or the gear 40 from overloads.

The power tool 10 is configured as a battery-powered drill or battery-powered screwdriver, for example. However, the components shown may also be readily used in hand tools having any other arbitrary drive, for example having an oscillating drive, such as jigsaws or sabre saws, having a rotary-oscillating drive, such as oscillating grinders or oscillating saws, or else in many other power tools suitable for further purposes.

FIG. 2a) shows an exemplary arrangement of exciter windings 50, 52, 54, which can be used in the electric motor 16 for generating the rotary field. The individual phases U, V, W are assigned to the contacts 20, 22, 24. A parallel circuit of three exciter windings is assigned to each of the phases U, V, W. The phase U can be activated via the contact 20 and can provide with the exciter windings 50a, 50b, 50c, which are connected in parallel. The phase V is activatable via the contact 22 and has a parallel circuit of the exciter windings 52a, 52b, 52c. The third phase W is provided with the contact 24 and the three exciter windings 54a, 54b, 54c, which are connected in parallel.

The exciter windings 50, 52, 54 interconnected in this way are further interconnected with one another via a contact 58 in the form of a star point.

It is obvious that the exciter windings 50, 52, 54 can also be interconnected in the form of a triangle. It is also conceivable that the parallel circuits configured according to FIG. 2a) in the individual phases U, V, W can also be configured as a series circuit or else as individual windings. In the case of three exciter windings 50, 52, 54 per phase U, V, W, four configurations fundamentally result, which can optionally be varied further by adding on or turning off individual windings. These are essentially a star parallel circuit according to FIG. 2, a star series circuit, a triangular circuit in series, and a triangular parallel circuit.

In this way, a large bandwidth of possible achievable speeds and torques can be covered using only one starting configuration.

A star series connection is shown as an example in FIG. 2b). In each case three individual windings, which are connected in series, result in one exciter winding 50' or 52' or 54', respectively, and run together in a star point 58.

A connector rack according to the invention, as is shown as an example in FIG. 3, is then provided for connection of the winding ends and for connection to the control electronics.

The connector rack shown in this case has, for example, two electronic mounting boards 62, 64, situated one over another, in the form of electronic circuit boards having contact carriers fastened thereon, an intermediate layer made of an insulating element 66 being situated between each of the individual mounting boards 62, 64. In the illustration according to FIG. 3, only one mounting board 62 is shown in its entirety for the purpose of better recognisability, while the insulating layers 66 situated above it or the further mounting board 64 is only partially shown.

The connector rack 60 has a basic shape in the form of a circular ring, whereby it is adapted to the structural form of an assigned stator of the electronically commutable motor. The shape and structural size are predefined by the structural shape of the electric motor 16, as is obvious in detail from FIG. 5.

According to the invention, the connector rack consists of a plurality of electronic mounting boards 62, 64 according to FIG. 3, which are configured as electronic circuit boards. Receptacle surfaces for receiving contact carriers, which are identified in FIG. 3 with 70, for example, are provided at predetermined points on the electronic mounting boards 62, 64. The contact carriers 70 are welding or soldering hooks having an area which extends essentially in the axial direction, i.e., perpendicular to the plane spanned by the respective mounting board plane, a bent-over end 71 being located at the upper end, which bent-over end is provided for clamped, welded, or soldered connection to an assigned wire terminal.

The relevant contact carriers 70 are preferably fixed at the provided fastening points with the aid of fastening elements 72 according to FIG. 4. In this case, for the purpose of precise positioning, plug elements 74 can be provided on the fastening elements 72, which consist of an insulating material, the plug elements engaging in assigned openings on the respective mounting board 62 or 64 or in an adjacent insulating element (not shown). With the aid of these fastening elements 72, precise positioning and pre-equipping of the contact carriers 70 on the respective mounting boards 62 or 64 can be ensured. Soldering or welding is subsequently performed. Alternatively or additionally, of course, the relevant contact carriers 70 can also be provided with suitable projections, which engage in corresponding recesses on the respective mounting boards 62 or 64, in order to support precise positioning.

FIG. 5 then shows the overall structure of an electronically commutable motor 60, which is contacted with such a connector rack 60.

The motor 16 has a stator 80, in which a total of nine exciter windings are received, which are connected to one another in the form of a star parallel circuit according to FIG. 2. For contacting the winding terminals, the connector rack 60 is provided, on which is inserted at one end of the stator into this, the individual winding terminals 82 being led upward in the direction of the connector rack 60 and being welded or soldered to the ends 71 of the contact carriers.

A rotor 84 is received so it is rotatable inside the stator 80, the rotor being provided with a motor shaft 86, which is mounted so it is rotatable around its longitudinal axis 81.

FIG. 6 shows an example on the basis of an exploded view of how various mounting boards according to FIGS. 6a) and 6c) are situated one over another, with an insulating element 94 according to FIG. 6b) interposed, and are subsequently connected among one another to form a compact unit. Grooves 91 or 93 are provided on the respective mounting boards 90 or 92, respectively, on the inner edge, which grooves are aligned with assigned pins 96 on the insulating element 94. Secure fixing and positioning of the mounting boards 90 or 92 are ensured in that the pins 96 of the insulating element 94 engage in the assigned grooves 91 or 93. The pins 96 consist of insulating material (base material of the mounting boards 90, 92).

Figure 8:
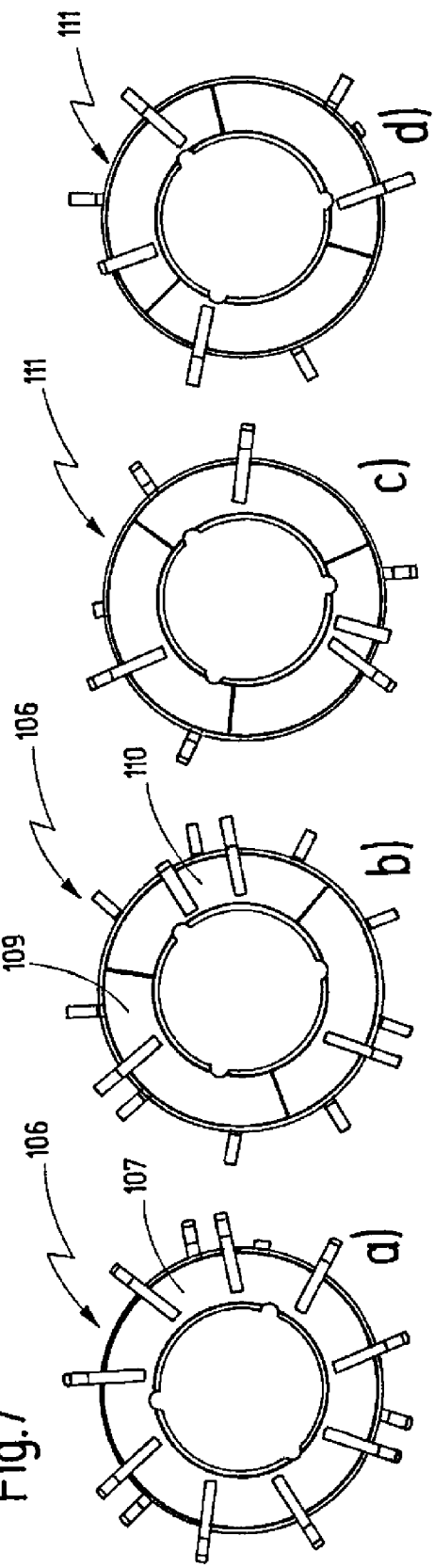
FIGS. 8a) to d) show two mounting boards having a continuous printed conductor on the top side of the first mounting board for implementing a star series circuit overall; with FIG. 8a) implementing a star point and printed conductors which are each divided into three segments.
FIG. 8b) showing the bottom side of the first mounting board.
FIGS. 8c) and d) showing the top side and the bottom side of the second mounting board.

Various embodiments of mounting boards are shown in horizontal projection in FIGS. 7 and 8 as examples.

According to FIGS. 7a) to d), two mounting boards 100, 103 are provided. The mounting boards 100, 103 consist of electronic circuit boards laminated on both sides, which are each configured as continuous, without any type of segmentation. FIG. 7a) shows the top side 101 of the first mounting board 100, FIG. 7b) shows the bottom side 102 of the first mounting board 100, FIG. 7c) shows the top side 104 of the second mounting board 103, and FIG. 7b) shows the bottom side 105 of the second mounting board 103. The first mounting board 100 is used to implement a star point. The bottom side 102 of the mounting board 100, and the top side and the bottom side of the second mounting board 103 according to FIGS. 7b), 7c), 7d) are provided to implement the second, third, and fourth layers, in order to be able to implement a star parallel circuit according to FIG. 2a) as a whole.

According to FIG. 8, two mounting boards 106, 111 are shown as examples, the top side 107 of the mounting board 106 according to FIG. 8a) being identical to the top side 101 of the mounting board 100 according to FIG. 7a). It is in turn provided for implementing the star point. The further three sides, bottom side of the mounting board 106, top side and bottom side of the mounting board 111 according to FIGS. 8b), c), d), are provided for connecting the windings in the case of a star series circuit. For this purpose, the circuit boards are each divided into three segments, as indicated on the bottom side of the mounting board 106 by the segments 105, 106, 107. Each segment extends over a peripheral area of 120° in this case.

The mounting boards 106, 111 according to FIGS. 8a) to d) are assembled with one another with insulating elements interposed, the positioning of the mounting boards 106, 111 to one another being fixed by the use of pins 96, as explained above on the basis of FIG. 6.

It is obvious that the illustration according to FIGS. 7 and 8 is solely of a purely exemplary nature and appropriately adapted mounting boards and contact elements can be used for implementing various circuits.

What is claimed is:

1. An electronically commutable motor comprising:
a stator having a plurality of exciter windings;
a rotor received rotatably within said stator;
a plurality of exciter windings arranged on said stator;
a controller for powering said exciter windings;
a connector rack for connecting said exciter windings and said controller; and
a plurality of pins arranged on said connector rack;
wherein said connector rack comprises at least two electronic boards arranged one on top the other and being separated by an insulating element, each electronic board carrying a plurality of contact carriers connected to said exciter windings and said controller, said contact carriers being soldered or welded to said electronic boards and at least some of said contact carriers are configured as welding or soldering hooks;
wherein said plurality of pins engage said electronic boards and said insulating element for mechanically connecting said electronic boards and said insulating element in a predetermined position relative to each other.

2. The motor of claim 1, wherein at least one of said electronic boards is configured as an electronic circuit board coated on two sides.

3. The motor of claim 1, wherein said contact carriers are configured as wire elements.

4. The motor of claim 1, wherein said contact carriers are configured as flat wire elements.

5. The motor of claim 4, wherein said contact carriers consist of copper wire.

6. The motor of claim 1, wherein said contact carriers at least partially have ends which are configured for fastening winding terminals by clamping, soldering, or welding.

7. The motor of claim 1, wherein said electronic boards configured substantially in the shape of a circular ring.

8. The motor of claim 1, wherein said contact carriers at least partially protrude substantially perpendicularly in the axial direction from a radial plane spanned by said electronic boards.

9. The motor of claim 1, wherein at least one electronic board has printed conductors, which are separate from one another, on at least one surface.

10. The motor of claim 1, wherein said pins consist of insulating material.

11. The motor of claim 1, further comprising at least one fastening element made of an insulating material for fixing a contact carrier on at least one of the at least two electronic boards.

12. The motor of claim 11, wherein said at least one fastening element comprises at least one plug element for engaging a recess provided on at least one of the at least two electronic boards.

13. The motor of claim 1, further comprising at least one fastening element made of an insulating material for fixing a contact carrier on at least one of the at least two electronic boards.

14. The motor of claim 13, wherein said at least one fastening element comprises at least one plug element for engaging a recess provided on at least one of the at least two electronic boards.

15. The motor of claim 1, wherein said at least two electronic boards comprise printed circuit boards.

16. An electronically commutable motor comprising:
a stator having a plurality of exciter windings;
a rotor received rotatably within said stator;
a plurality of exciter windings arranged on said stator;
a controller for powering said exciter windings; and
a connector rack for connecting said exciter windings and said controller; and
a plurality of pins arranged on said connector rack;
wherein said connector rack comprises at least two electronic boards carrying a plurality of contact carriers connected to said exciter windings and at least some of the contact carriers are configured as welding or soldering hooks, said at least two electronic boards arranged at least in part along a longitudinal length of said rotor where one electronic board is arranged one on top of the other; and
wherein said plurality of pins engage said electronic boards and said insulating element for mechanically connecting said electronic boards and said insulating element in a predetermined position relative to each other.

17. The motor of claim 16, wherein said at least two electronic boards comprise printed circuit boards.

18. A connector rack in an electric motor, the electric motor comprising:
a stator having a plurality of exciter windings;
a rotor received rotatably within said stator;
a plurality of exciter windings arranged on said stator;
a controller for powering said exciter windings;
wherein said connector rack is configured for connecting said exciter windings and said controller and comprises at least two electronic boards carrying a plurality of contact carriers for connecting said exciter windings and said controller, said contact carriers being soldered or welded to said electronic boards and said at least two electronic boards arranged at least in part along a longitudinal length of said rotor where one electronic board is arranged one on top of the other; and further comprises a plurality of pins engaging said electronic boards and said insulating element for mechanically connecting said electronic boards and said insulating element in a predetermined position relative to each other.

19. The motor of claim 18, wherein said at least two electronic boards comprise printed circuit boards.

* * * * *